US006747710B2

(12) United States Patent
Hall, Jr. et al.

(10) Patent No.: US 6,747,710 B2
(45) Date of Patent: Jun. 8, 2004

(54) LIGHT VALVE PROJECTOR ARCHITECTURE

(75) Inventors: Estill Thone Hall, Jr., Fishers, IN (US); Eugene Murphy O'Donnell, Fishers, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/006,401

(22) Filed: Dec. 3, 2001

(65) Prior Publication Data

US 2003/0103171 A1 Jun. 5, 2003

(51) Int. Cl.[7] .................................... G02F 1/1335
(52) U.S. Cl. ...................... 349/9; 349/96; 349/117; 353/33
(58) Field of Search .................... 349/5, 8, 9, 61, 349/113, 117, 96, 60, 69, 70; 313/461, 506, 509; 353/31, 34, 37, 122, 33; 348/776

(56) References Cited

U.S. PATENT DOCUMENTS

| 5,469,018 A | 11/1995 | Jacobsen et al. ............ 313/461 |
| 5,580,142 A | 12/1996 | Kurematsu et al. ............ 353/31 |
| 5,804,919 A | 9/1998 | Jacobsen et al. ............. 313/506 |
| 5,959,773 A | 9/1999 | Gagnon ....................... 359/495 |
| 6,198,211 B1 | 3/2001 | Jaffe et al. ................... 313/461 |

FOREIGN PATENT DOCUMENTS

WO    WO 01/72048    *   9/2001

* cited by examiner

Primary Examiner—Kenneth Parker
Assistant Examiner—Tai Duong
(74) Attorney, Agent, or Firm—Joseph S. Tripoli; Harvey D. Fried; Joseph J. Kolodka

(57) ABSTRACT

A light valve projection system (30) includes a plurality of resonant microcavity anodes (RMAs) (32, 42, and 52), each for emitting a respective wavelength of light and an imager device (38, 48, and 58) for each of the plurality of resonant microcavity anodes, where each of the imager devices emits an image. The light valve projection system further includes a plurality of polarizing beam splitters (34, 44, and 54) for reflecting and redirecting the light and images from the RMAs and the imager devices. The light valve projection system may further include a combiner (40) for combining the image from each of the imager devices and a projection lens (50) for receiving a combined image from the combiner.

15 Claims, 3 Drawing Sheets

RMA DEVICE "S" OUTPUT

RMA DEVICE "P" OUTPUT

LIGHT VALVE PROJECTOR ARCHITECTURE

BACKGROUND OF THE INVENTION

1. Field of the Invention

This invention relates to the field of light valve projection systems, and more particularly, to a light valve projection system using a resonant microcavity anode (RMA).

2. Description of Related Art

Currently, one of the major issues with non-CRT projection displays is the lack of an adequate light source for illumination. The existing technology is inefficient, short lived, and requires major optical systems to transfer the light into a usable form.

Conventional cathode ray tube (CRT) displays use electrons emitted from an electron gun and accelerate them through an intense electric field projecting them onto a screen coated with a phosphor material in the form of a powder. The high-energy electrons excite luminescence centers in the phosphors which emit visible light uniformly in all directions. CRT's are well established in the prior art and are commonly found in television picture tubes, computer monitors and many other devices.

Displays using powder phosphors suffer from several significant limitations, including: low directional luminosity (i.e., brightness in one direction) relative to the power consumed; poor heat transfer and dissipation characteristics; and a limited selection of phosphor chromaticities (i.e., the colors of the light emanating from the excited phosphors). The directional luminosity is an important feature of a display because the directional properties influence the efficiency with which it can be effectively coupled to other devices (e.g., lenses for projection CRT's). For direct viewing purposes this is desirable, as the picture can be seen from all viewing angles. However, for certain applications a Lambertian distribution (the normal light flux pattern observed from a luminescent screen where light is emitted uniformly in all directions) of the light flux is inefficient. These applications include projection displays and the transferring of images to detectors for subsequent image processing. Heat transfer and dissipation characteristics are important because one of the limiting factors in obtaining bright CRT's suitable for large screen projection is the heating of the phosphor screen. Chromaticity is important because the faithful reproduction of colors in a display requires that the three primary-color phosphors (red, green and blue) conform to industry chromaticity standards (i.e., European Broadcasting Union specifications). Finding phosphors for each of the three primary colors that exactly match these specifications is one of the most troublesome aspects of phosphor development.

Another consideration is the vacuum in a CRT. To allow the electron beam to travel between the electron gun and the phosphor screen, a vacuum must be maintained within a CRT. Conventional powder phosphors have a high total surface area and, generally, organic compounds are used in their deposition. Both the high surface area and the presence of residual organic compounds cause problems in holding and maintaining a good vacuum in the CRT. Using thin-film phosphors overcomes both of these effects, as the total external surface area of the tube is controlled by the area of the thin-film (which is much less than the surface area of a powder phosphor display) and, furthermore, there are no residual organic compounds present in thin-film displays to reduce the vacuum in the sealed tube.

The thin-film phosphors, though, exhibit one prohibiting disadvantage, however, due to the phenomenon of "light piping." Light piping is the trapping of light within the thin-film, rendering it incapable of being emitted from the device. This is caused by the total internal reflection of the light rays generated within the thin-film. Since the index of refraction (n) of most phosphors is around n=2, only those light rays whose incident angles are less than the critical angle, will be emitted from the front of the thin-film. The critical angle for an n=2 material is around 30 degrees. Therefore, the fraction of light that escapes from the front of the thin-film is only about 6.7% of the total light. The common design of placing a highly reflective aluminum layer behind the film only doubles the output to about 13% of the light. Moreover, this light is spread in a "lambertian distribution" and is not directional. As a result of light piping, the external efficiency (i.e., the percentage of photons escaping from the display relative to all photons created in the display) is less than one-tenth that of powder phosphor displays. Therefore, in spite of the unique advantages offered in terms of thermal properties, resolution, and vacuum maintenance; the development of commercial CRT devices based on thin-films is held back by their poor efficiency due to "light piping".

Microcavity resonators, which can be incorporated in the present invention, have existed for some time. Microcavities are one example of a general structure that has the unique ability to control the decay rate, the directional characteristics and the frequency characteristics of luminescence centers located within them. The changes in the optical behavior of the luminescence centers involve modification of the fundamental mechanisms of spontaneous and stimulated emission. Physically, such structures as microcavities are optical resonant cavities with dimensions ranging from less than one wavelength of light up to tens of wavelengths. These have been typically formed as one integrated structure using thin-film technology. Microcavities involving planar, as well as hemispherical, reflectors have been constructed for laser applications.

Resonant microcavities with semiconductor active layers, for example silicon or GaAs, have been developed as semiconductor lasers and as light-emitting diodes (LEDs).

Microcavities have been used with lasers, but the laser microcavity devices work above a laser threshold, with the result that their response is inherently nonlinear near this threshold and their brightness is limited to a narrow dynamic range. Displays, conversely, require a wide dynamic range of brightness. Microcavity lasers utilize stimulated emission and not spontaneous emission. As a result, these devices produce highly coherent light making these devices less suitable for use in displays. Highly coherent light exhibits a phenomenon called speckle. When viewed by the eye, highly coherent light appears as a pattern of alternating bright and dark regions of various sizes. To produce clear, images, luminescent displays must produce incoherent light.

The resonant microcavity display or resonant microcavity anode (RMA) is more fully described in U.S. Pat. No. 5,469,018 (to Jacobsen et. al), U.S. Pat. No. 5,804,919 (to Jacobsen et al), and U.S. Pat. No. 6,198,211 (to Jaffe et al), and in an article written by Jaffe et al entitled "Avionic Applications of Resonant Microcavity Anodes", all hereby incorporated by reference. The controlled light output of an RMA utilizes a thin film phosphor inside a Fabry-Perot resonator. The structure of a monochrome RMA can consist of a faceplate having a thin film phosphor embedded inside a resonant microcavity. The references mentioned above clearly describe the benefits of using an RMA arrangement over a conventional CRT arrangement using phosphor powders.

As described above, a major problem with non-CRT projection displays is the lack of an adequate light source for illumination of the projection system. The existing technology such as most arc lamps is inefficient, short lived, and requires major optical systems to transform the light into a usable form. Although a ultra high pressure (UHP) arc lamp made by Philips has become the industry standard due to its reasonable lifespan, the Philips UHP arc lamp still has many of the detriments of inefficiency and required overhead for transforming due to the non-coherent nature of the light source. Furthermore, in order to utilize the UHP lamp in such a projection system would require a very small arc to make a sensible etendue, and therefore an efficient optical system. The very small arc, however, would limit the light output. A small arc lamp also implies a reduced lifetime on the light source. Thus, the bulb would need to be changed several times during the life of a TV set if used for such purposes. Arc lamps and other similar light sources are by their nature broadband in output and therefore generate infrared, ultraviolet, and non-primary visible light, as well as red, green, and blue which is useful for projection. The inefficiencies of color filters used to process this light also leads to broader band colors and therefore smaller color space. Light sources such as arc lamps also produce random "mixed" polarization, and therefore require additional optical system components to handle poloarization separation. To further enhance "entendue", a complex system of integrators and collimators are required to transform a focused beam from a light source (such as an arc lamp into) a uniform rectangular illumination. In addition, since light coming from the lamps are essentially white, dedicated dichroic filters would be necessary to produce red, green, and blue light necessary for a projection system. As a result of all the hardware required to overcome the problems described above, a large, bulky optical system would be need for the purpose of achieving a rectangle of light of the correct color and polarization on the display device.

Thus, a need exists to utilize the advantages of resonant microcavity technology in light valve projection systems as described herein.

SUMMARY

In a first aspect of the present invention, a LCOS projection system comprises a plurality of resonant microcavity anodes (RMAs), each for emitting a respective wavelength of light, a liquid crystal on silicon (LCOS) device for each of the plurality of resonant microcavity anodes, wherein each of the LCOS devices emits an image, a plurality of polarizing beam splitters for reflecting and redirecting the light and images from the RMAs and the LCOS devices, and a means for combining the images to provided a combined image.

In a second aspect of the present invention, a light valve projection system comprises a plurality of resonant microcavity anodes (RMAs), each for emitting a respective wavelength of light, an imager device for each of the plurality of resonant microcavity anodes, wherein each of the imager devices emits an image, and a plurality of polarizing beam splitters for reflecting and redirecting the light and images from the RMAs and the imager devices.

In a third aspect of the present invention, a light valve projection system using a combined resonant microcavity anode field emission display, comprises at least a first illumination source, wherein the illumination source has an array of field emission display points for receiving a first input on a first side of a vacuum cavity and a corresponding array of resonant microcavity anodes on a second side of the vacuum cavity, and at least a first LCOS device illuminated by the illumination source.

In a fourth aspect of the present invention, a light valve projection system using a combined resonant microcavity anode cathode ray tube comprises at least a first illumination source, wherein the illumination source receives a plurality of inputs simultaneously on a cathode of a first side of a vacuum cavity having no deflection coils and a corresponding array of resonant microcavity anodes on a second side of the vacuum cavity, and at least a first LCOS device illuminated by the illumination source.

DETAILED DESCRIPTION

A The present invention utilizes RMA technology to illuminate LCOS or other light valve projection systems. Current architectures for inputting light into light valve devices are based upon white light sources as described above, and therefore require separation of red, green and blue before applying the light to the imagers. With the use of RMA technology, separate red, green, and blue light sources could be used to provide the architectures proposed herein.

Figure 1:
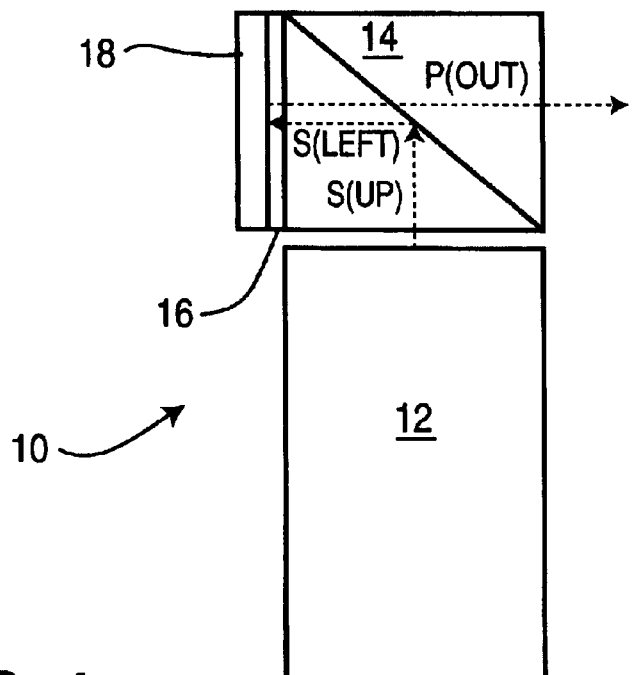
FIG. 1 is a block diagram of a subassembly of a light valve projection system utilizing an RMA "S" mode device in accordance with the present invention.

There are two possible modes of operation for an RMA device providing either "S" polarized output light or "P" polarized output light. As shown in FIG. 1, the output light is "S" polarized and as shown in FIG. 2, the output light is "P" polarized.

Referring to FIG. 1, an illumination system subassembly 1 0 comprises an RMA light source 12 with an "S" polarized light output in the upward direction as shown. The light is provided through the bottom of the polarizing beam splitter (PBS) 14, wherein the light is reflected left towards a quarter-wave plate 16 and onto an LCOS device 18. The quarter wave plate is used for skew rate compensation. The reflection of light from the LCOS device 18 goes through the PBS 14 to provide a "P" polarized output of red, green, or blue light depending on the light source.

Figure 2:
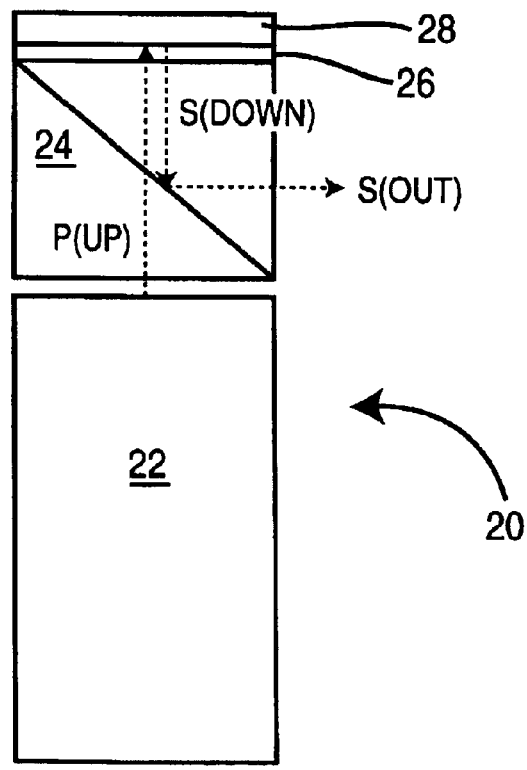
FIG. 2 is a block diagram of a subassembly of a light valve projection system utilizing an RMA "P" mode device in accordance with the present invention.

Referring to FIG. 2, an illumination system subassembly 20 comprises an RMA light source 22 with an "P" polarized light output in the upward direction as shown. The light is provided through the bottom of the polarizing beam splitter (PBS) 24, wherein the light travels through the PBS 24, through a quarter wave plate 26 and onto a LCOS device 28 on the top of the quarter wave plate 26. The light reflected down from the LCOS device 28 goes through the quarter-wave plate 26 and reflected right in the PBS 24 to provide a polarized "S" output of red, green, or blue light depending on the light source. It should be understood that the RMA light sources described herein could come in various configurations in accordance with the present invention and the particular embodiments described herein are merely representative examples. The RMA light source used in the system of the present invention could be a combined RMA CRT or a combined RMA field emission display (FED) device for example. The illumination source for a combined RMA FED could have an array of field emission display points for receiving a first input on a first side of a vacuum cavity and a corresponding array of resonant microcavity anodes on a second side of the vacuum cavity while a combined RMA CRT could receives a plurality of inputs simultaneously on a cathode of a first side of a vacuum cavity having no deflection coils and a corresponding array of resonant microcavity anodes on a second side of the vacuum cavity. Of course, other combinations and variations utilizing an RMA to provide a source of light for use in conjunction with the architecture described is contemplated herein.

Figure 3:
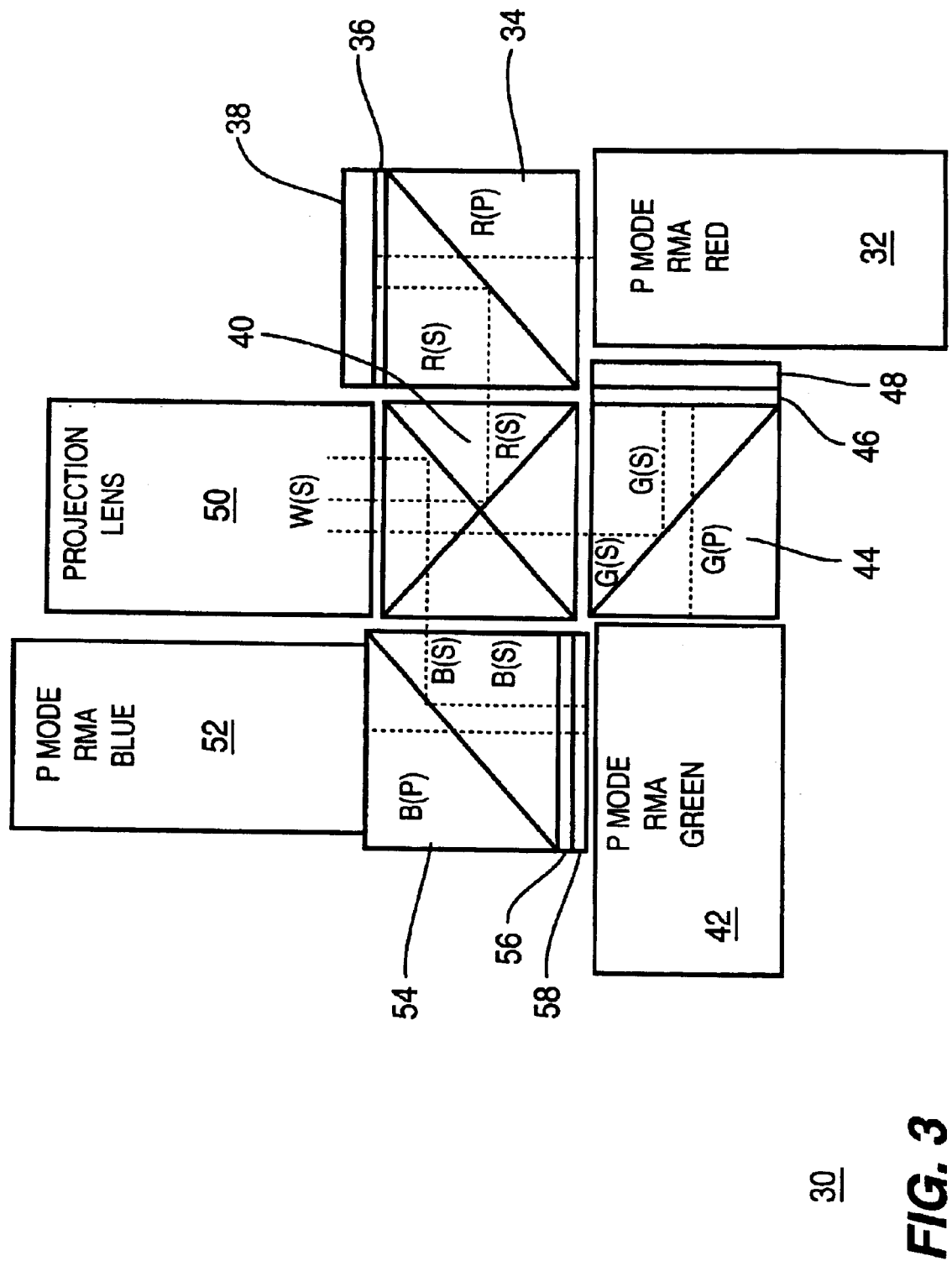
FIG. 3 is a block diagram of a light valve projection system in accordance with the present invention.

Referring to FIG. 3, there is shown an LCOS projection system 30 comprising a plurality of "P" mode resonant microcavity anodes (RMAs), each for emitting a respective wavelength of light. The system 30 utilizes a LCOS device for each of the plurality of resonant microcavity anodes, wherein each of the LCOS devices emits an image. The system also has a plurality of polarizing beam splitters for reflecting and redirecting the light and images from the RMAs and the LCOS devices and a means for combining the images to provided a combined image to a projection lens.

In this instance, there is shown three separate subassemblies, one for each color (red, green, and blue) and further utilizing dichroic color combination. A red "P" mode RMA light source 32 (in a "rear" position in the projection system 30) provides an output light through a PBS 34 and a quarter wave plate 36 and onto a LCOS device 38. The reflection of red light goes back through the quarter wave plate and the PBS 34 and is reflected left into a conventional crossed dichroic combiner 40. A blue "P" mode RMA light source 52 (in a "front" position in the projection system 30) provides a blue output light through a PBS 54 and a quarter wave plate 56 and onto a LCOS device 58. The reflection of blue light goes back through the quarter wave plate 56 and the PBS 54 and is reflected right into the conventional crossed dichroic combiner 40. A green "P" mode RMA light source 42 (in a "side" position in the projection system 30) provides a green output light through PBS 44 and a quarter wave plate 46 and onto a LCOS device 48. The reflection of green light goes back through the quarter wave plate 46 and is reflected up in the PBS 44 up through the crossed dichroic combiner 40. The crossed dichroic combiner 40 provides the reflected images in red, green, and blue from respective LCOS devices 38, 48, and 58 and provides such images to a projection lens 50. It should be understood that there are clearly other variations of this arrangement within the spirit and scope of the present invention. For example, a mirror image of this structure where the red RMA light source is in a "forward" position and the blue RMA light source is in a "rear" position in the projection system. Alternatively, "S" mode RMA light sources could be used instead with a "P-mode" dicrhoic combiner rather than the standard crossed dichroic combiner 40.

Figure 4:
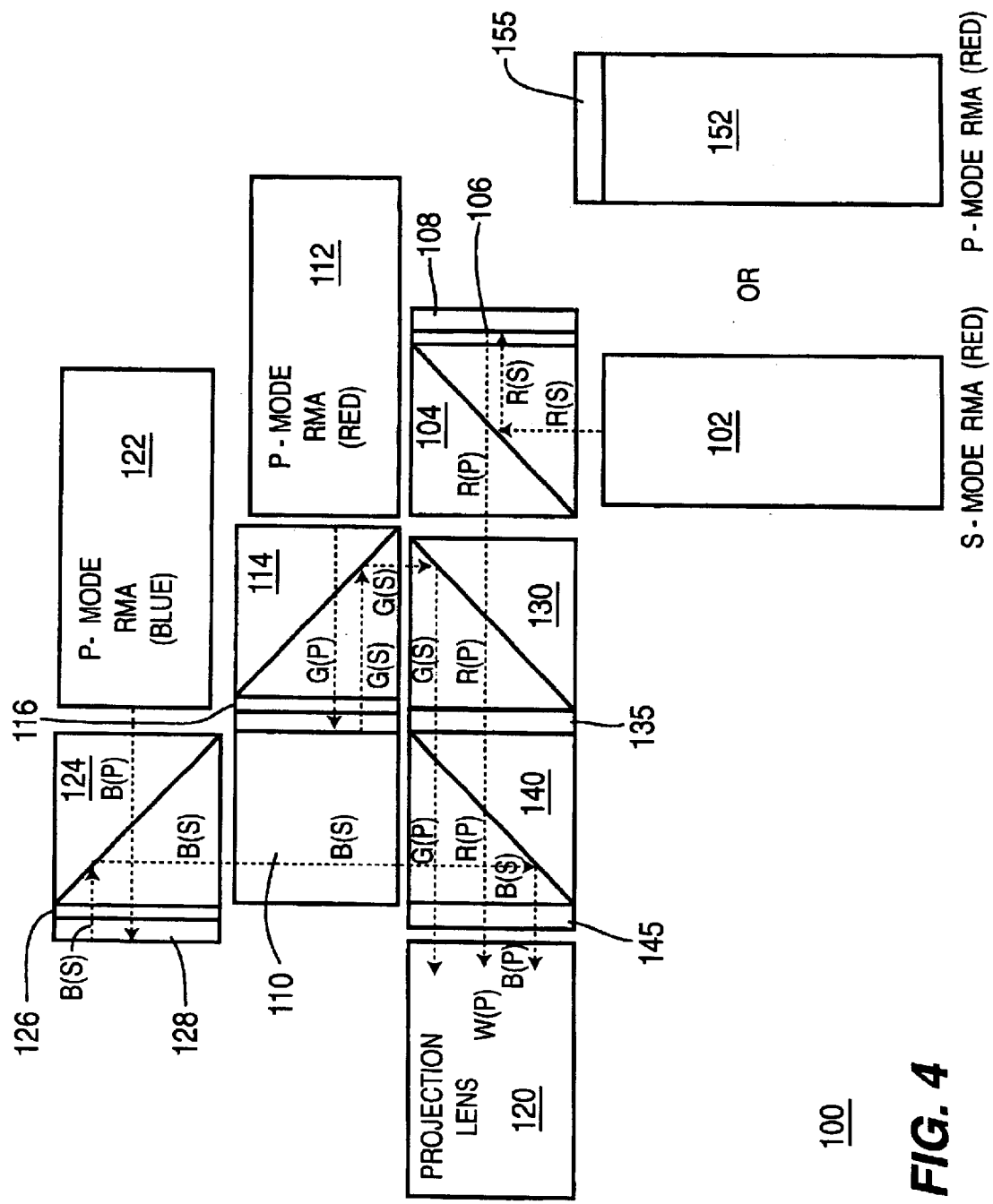
FIG. 4 is a block diagram of an alternative light valve projection system in accordance with the present invention.

Referring to FIG. 4, there is shown an alternative embodiment of a LCOS projection system utilizing a ColorSelect™ color combination system by ColorLink, Inc. ColorLink's ColorSelect polarization filter technology essentially consists of bonded stacks of stretched polycarbonate sheets that selectively rotate the polarization of one color relative to its compliment. By using these filters and PBSs, color separation and recombination can be achieved without jeopardizing polarization integrity or contrast. In this embodiment, a blue/yellow filter, a green/magenta filter, and an optional red/cyan filter are used. The LCOS projection system 100 is more efficient in that it uses 5 PBS's and one compensation cube rather than 3 PBS's and one crossed dichroic cube.

Once again, there is shown three separate subassemblies, one for each color (red, green, and blue) and further utilizing ColorSelect color combination filters for selecting between blue and yellow, green and magenta, or red and cyan as will become further apparent with the explanation below. A red "S" mode RMA light source 102 (in a "side" position in the projection system 100) provides an output light through a PBS 104 which reflects the light right through a quarter wave plate 106 and onto a LCOS device 108. The reflection of light from LCOS device 108 goes back through the quarter wave plate 106, the PBS 104, and through PBS 130, PBS 140 and onto the projection lens 120. A blue "P" mode RMA light source 122 (in a "first rear" position in the projection system 100) provides a blue output light through a PBS 124 and a quarter wave plate 126 and onto a LCOS device 128. The reflection of blue light goes back through the quarter wave plate 126 and the PBS 124 and is reflected down through a pathlength compensator cube 110. From the cube 110, the blue light goes through PBS 140 and is reflected left through a Blue/Yellow ColorSelect device and into the projection lens 120. A green "P" mode RMA light source 112 (in a "second rear" position in the projection system 100) provides a green output light through PBS 114 and a quarter wave plate 116 and onto a LCOS device 118. The reflection of green light from LCOS device 118 goes back through the quarter wave plate 116 and is reflected down into the PBS 130, where it is reflected left through a Green/Magenta ColorSelect device (through PBS device 140) and into the projection lens 120. It should be noted that the "S" mode RMA light source 102 could be replaced with a "P" mode RMA light source 152 utilizing a Red/Cyan ColorSelect device 155 as shown without departing from the spirit of the present invention. It should be noted that the ColorSelect devices 135, 145, and 155 serve as filters that rotate the polarization of the selected colors. Thus, the projection system 100 provides the reflected images in red, green, and blue (or other "ColorSelected") colors from respective LCOS devices 108, 118, and 128 and provides such images to the projection lens 120. As previously mention, this embodiment avoids the use of a dichroic combiner.

It should be understood that the present invention could described in a myriad of different other arrangements within the scope of the claims or that other imagers could be used other than LCOS microdisplays as described herein. Although the present invention has been described in conjunction with the embodiments disclosed herein, it should be understood that the foregoing description is intended to illustrate and not limit the scope of the invention as defined by the claims.

What is claimed is:

1. A light valve projection system, comprising:
   a plurality of resonant microcavity anodes (RMAs) for emitting respective wavelengths of light;
   a reflector light valve device for each of the plurality of resonant microcavity anodes, and for reflecting said wavelengths of light from said RMAs; and
   a plurality of polarizing beam splitters for selectively passing through and redirecting said wavelengths of light from said reflector light valve devices and said RMAs.

2. The light valve projection system of claim 1 wherein the system further comprises a combiner for combining said wavelengths of lights selectively passed through and redirected by said polarizing beam splitters.

3. The light valve projection system of claim 1, wherein the light reflector valve device comprises a LCOS microdisplay.

4. The light valve projection system of claim 2, wherein the system further comprises a projection lens for receiving said wavelengths of light out of the combiner.

5. The light valve projection system of claim 2, wherein the combiner is a crossed dichroic combiner.

6. The light valve projection system of claim 2 wherein the combiner comprises a light pathlength compensator cube and a polarizing filter system that selectively rotates polarization of one color relative to its compliment.

7. The light valve projection system of claim 1, wherein the system further comprises a light pathlength compensator cube.

8. The light valve projection system of claim 7, wherein the system further comprises a polarizing filter system that selectively rotates polarization of one color relative to its compliment.

9. The light valve projection system of claim 1 wherein the plurality of resonant microcavity anodes are selected from the group of either "P" mode RMA devices or "S" mode RMA devices.

10. A LCOS projection system, comprising:

a plurality of resonant microcavity anodes (RMAs) for emitting respective wavelengths of light;

a liquid crystal on silicon (LCOS) device for each of the plurality of resonant microcavity anodes and for reflecting said respective wavelengths of light;

a plurality of polarizing beam splitters for selectively passing through and redirecting said wavelengths of light from the RMAs and the LCOS devices; and a means for combining said wavelengths of light selectively passed through and redirected by said polarizing beam splitters.

11. The LCOS projection system of claim 10 wherein the projection system further comprises a projection lens for projecting the respective wavelengths of light from said means for combining.

12. The LCOS projection system of claim 10, wherein the means for combining comprises a crossed dichroic combiner.

13. The LCOS projection system of claim 10, wherein the means for combining comprises a color wavelength selector and a light path length compensator.

14. The LCOS projection system of claim 10 wherein each LCOS device comprises a combined LCOS microdisplay and quarter wave length plate.

15. The LCOS projection system of claim 10 wherein the plurality of resonant microcavity anodes are selected from the group of either "P" mode RMA devices or "S" mode RMA devices.

* * * * *